July 31, 1956 B. FERRARA 2,756,791
SCREW HOLDER FOR SCREW DRIVER
Filed July 1, 1953
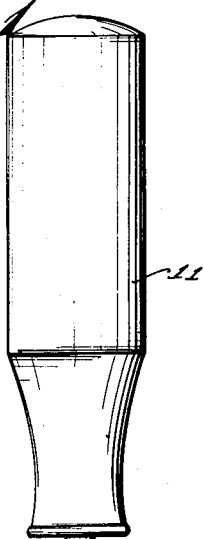
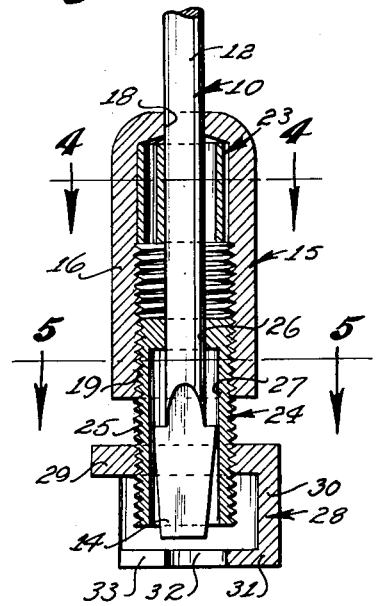
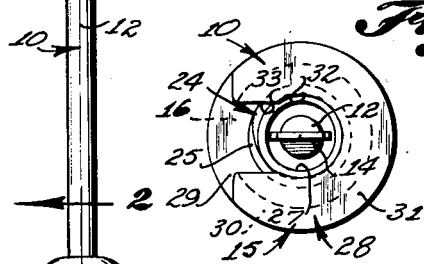
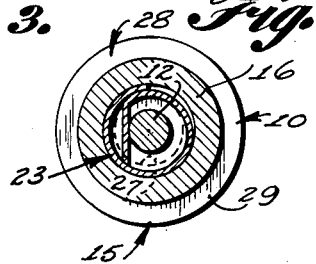
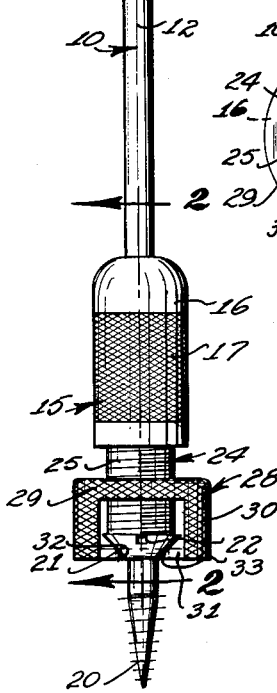
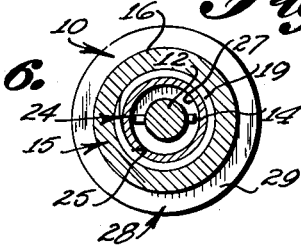
INVENTOR.
*Benjamin Ferrara*
BY *Victor J. Evans & Co.*
ATTORNEYS

United States Patent Office 2,756,791
Patented July 31, 1956

2,756,791
SCREW HOLDER FOR SCREW DRIVER

Benjamin Ferrara, East Boston, Mass.

Application July 1, 1953, Serial No. 365,371

2 Claims. (Cl. 145—50)

This invention relates to a screw driver, and particularly to a screw holder for a screw driver.

This invention is an improvement over the screw driver screw holder shown and described in my co-pending application, Serial No. 287,554, now Patent Number 2,709,466.

The object of the invention is to provide a screw holder for attachment to a screw driver which will facilitate the starting of screws and the like.

Another object of the invention is to provide a screw holding device which serves to position and hold a screw, the screw holder of the present invention being simple and inexpensive to manfacture.

Other objects and advantages will be apparent during the course of the following description.

In the accompanying drawings, forming a part of this application, and in which like numerals are used to designate like parts throughout the same:

Figure 1 is an elevational view of the screw holder attached to a screw driver.

Figure 2 is a sectional view taken on the line 2—2 of Figure 1.

Figure 3 is an end elevational view showing the screw holder mounted on the screw driver.

Figure 4 is a sectional view taken on the line 4—4 of Figure 2.

Figure 5 is a sectional view taken on the line 5—5 of Figure 2.

Figure 6 is a view of the spring used in the screw holder attachment.

Referring in detail to the drawings, the numeral 10 designates a screw driver of conventional construction which includes a handle 11, a shank 12, and a blade or bit 14.

The present invention is directed to a screw holder 15, and the screw holder 15 includes a body member 16 that has a knurled portion 17 for facilitating the handling thereof. An opening 18 is arranged in an end of the body member 16 for the projection therethrough of the shank 12, and the body member 16 is provided with an interior threaded portion 19 for a purpose to be later described.

In Figure 1 there is shown one of the screws 20 that is adapted to be held while it is being started, and the screw is indicated by the numeral 20. The screw 20 includes a head 21 that may be tapered, and the head 21 is provided with a kerf or slit 22 for engagement by the blade 14 of the screw driver.

Mounted in the body member 16 is a curved spring 23 which surrounds the shank 12 of the screw driver. A sleeve 24 is provided, and the sleeve 24 has exterior threads as at 25. An opening 26 extends through the sleeve 24, and the shank 12 extends through the opening 26. A chamber or space 27 is provided in the sleeve 24 for receiving the blade 14 of the screw driver.

The screw holder of the present invention further includes a chuck 28 which embodies a web 29 that threadedly engages the sleeve 24. A support portion 30 extends from the web 29, and a wall member 31 extends from the support portion 30. The wall member 31 is provided with a circular opening 32 for the projection therethrough of the screw 20, and a slot 33 is provided in the wall member 31. The slot 33 communicates with the opening 32, and the slot 33 permits the screw to be readily removed from or placed in the chuck.

From the foregoing it is apparent that a screw driver holder has been provided which is an improvement over the screw driver holder shown and described in my copending application, Serial No. 287,554. In use, the screw such as the screw 20 is removed through the slot 33 and inserted through the opening 32. Then, by rotating the screw driver the blade 14 will engage the kerf 22 to start the screw 20 in the desired structure. The screw is clamped between the sleeve 24 and the wall member 31 and the screw driver bit 14 is pushed into the slot 22 when the screw is to be turned.

In the present invention the structure is composed of less parts than that shown in my co-pending application, and the coil spring 23 serves the same purpose as the sleeves and clamping nut described in my other application. Thus, the spring 23 maintains the body member in place by friction on the shank 12. The present invention is extremely simple and inexpensive to manufacture.

I claim:

1. A screw holder for a screw driver having a shank and a blade, comprising a body member provided with an opening in an end for the projection therethrough of the screw driver shank, said body member being threaded interiorly, a spring member positioned in said body member and engaging the shank of the screw driver, a sleeve having exterior threads for engaging the threaded interior of said body member, the shank of the screw driver extending through said sleeve, said sleeve being provided with a chamber for receiving said blade, and a chuck mounted on the outer end of said sleeve, said chuck including a web threadedly engaging said sleeve, a support portion extending from said web, and a wall member extending from said support portion, said wall member being provided with a central opening for the projection therethrough of a screw, there being a slot in said wall member communicating with said opening.

2. In a screw holder for a screw driver having a shank and a blade, a body member having an exteriorly knurled portion provided with an opening of circular shape in an end for the projection therethrough of the screw driver shank, said body member being threaded interiorly for a portion of its length, a spring member positioned in said body member and engaging the shank of the screw driver, a sleeve having exterior threads for engaging the threaded interior of said body member, the shank of the screw driver extending through said sleeve, said sleeve being provided with a chamber for receiving said blade, and a chuck mounted on the outer end of said sleeve, said chuck including a web threadedly engaging said sleeve, a support portion extending from said web and arranged at right angles with respect thereto, and a wall member extending from said support portion and arranged in spaced parallel relation with respect to said web, said wall member being provided with a central opening for the projection therethrough of a screw, there being a slot in said wall member communicating with said opening, said slot being of less width than said last named opening, said wall member being spaced from the end of said sleeve.

References Cited in the file of this patent

UNITED STATES PATENTS

| 772,912 | Allan | Oct. 25, 1904 |
| 1,116,532 | Armstrong | Nov. 10, 1914 |
| 1,256,139 | Kietlinski | Feb. 12, 1918 |
| 1,311,147 | Berntsen | July 22, 1919 |
| 2,536,191 | Lewis | Jan. 2, 1951 |

FOREIGN PATENTS

| 956,018 | France | Jan. 23, 1950 |